Dec. 16, 1947.  C. W. SCOTT  2,432,941
PROPELLER RELEASING MECHANISM
Filed Dec. 6, 1941
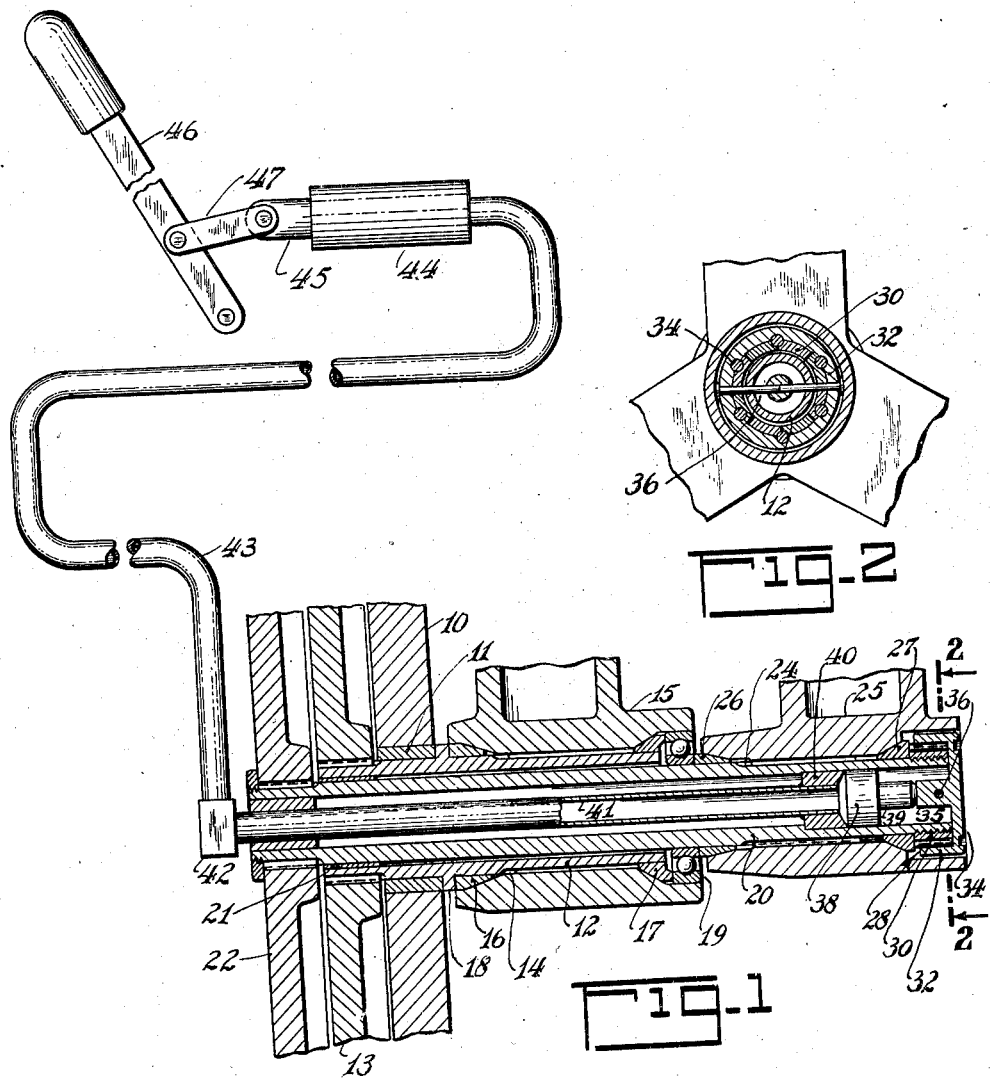
INVENTOR
Carl W. Scott.
BY
ATTORNEY Patented Dec. 16, 1947

2,432,941

UNITED STATES PATENT OFFICE 2,432,941

PROPELLER RELEASING MECHANISM

Carl W. Scott, Ferguson, Mo., assignor to Curtiss-Wright Corporation, a corporation of Delaware Application December 6, 1941, Serial No. 421,939

11 Claims. (Cl. 170—177)

This invention relates to safety devices for aircraft and is particularly concerned with the release of aircraft propellers during flight.

In certain types of aircraft, particularly those provided with pusher propellers, e. g., as illustrated in Design Patent No. 111,885 to R. J. Woods, there is great danger that members of the aircraft crew may fall into the path of the propeller blades should it become necessary for them to make an emergency exit from the aircraft cabin during flight. Should some portion of the aircraft fail during flight, the aircraft crew leaves the aircraft for a parachute descent and in leaving, they may become tangled with or injured by the propeller blades.

Thus, it is an object of this invention to provide means by which the aircraft propeller may be released from its driving shaft to fall clear of the aircraft before emergency exit of the crew. A further object is to provide a device for locking the propeller upon its shaft during normal operation of the aircraft power plant and to provide in addition, selectively operable means associated with the propeller to sever the driving connection between the shaft and the propeller and to allow the propeller to fall clear of its shaft.

The invention consists essentially of an aircraft assembly including a propeller shaft and a propeller mounted thereon for rotation therewith during normal aircraft flight, said propeller being bodily sheddable in a flight emergency; means for locking said propeller to said shaft during normal aircraft flight; mechanical means operable during propeller rotation and while the aircraft is in flight to release said locking means, said propeller when so released being free to move along and off an end of said shaft; and a control means (mechanical, electrical, hydraulic or otherwise) for said mechanical release means operable from within and by an occupant of the space within the aircraft normally provided for such occupancy.

Further objects of the invention, and a better understanding of the details thereof, will be appreciated in reading the annexed detailed specification in connection with the drawings, in which:

Fig. 1 is a longitudinal section through a tandem propeller hub and shaft assembly incorporating the provisions of the invention; and Fig. 2 is a section on the line 2—2 of Fig. 1.

A portion of an engine crankcase or other support structure is indicated at 10, this element having a bushing 11 in which an outer propeller shaft 12 is journalled, said shaft at its leftward end having a gear 13 driven by suitable means, not shown, from an aircraft engine. The righthand end of the shaft 12 is splined as at 14 to receive a propeller hub 15, the hub being maintained in concentric relation with the shaft 12 by centering cones 16 and 17, the former abutting a shoulder 18 on the shaft 12 and the latter being urged leftwardly by a ball thrust bearing 19 embracing an inner propeller shaft 20 journalled at its leftward end in a bushing 21 in the shaft 12. The leftward end of the shaft 20 carries a gear 22 driven by the engine. The rightward end of the shaft 20 comprises splines 24 driving a forward propeller hub 25 which is centered on the shaft 20 by centering cones 26 and 27. The cone 26 presses leftwardly against the inner race of the bearing 19, thereby holding the rear propeller 15 in place while the righthand cone 27 is pressed leftwardly by a propeller retaining nut designated in its entirety as 28.

The nut 28 comprises a plurality of segments 30 interiorly threaded to engage the screw threads on the shaft 20, the segments 30 being embraced by a sleeve 32 axially slidable relative to the segments but constrained to rotation therewith by keys or splines 34 parallel to the shaft axis and fitted to grooves in the inside of the sleeve 32 and on the outsides of the segments 30. The sleeve 32 includes an end closure 34' having a leftwardly projecting boss 35 and the sleeve and segments are retained in assembled relation by a shear pin 36 passing crosswise through them and also through the propeller shaft 12.

Within the propeller shaft 20, whose rightward end is formed as a cylinder, is a piston 38 having a portion 39 abutting the boss 35, the cylinder being defined at its left end by a plug 40 having a tube 41 passing therethrough. The tube 41 extends to the left to a suitable spinner bearing 42 connected through a pipe 43 to a cylinder 44 in which is engaged a manually reciprocable plunger 45 operated by a handle 46 through a link 47. The cylinder 44, pipes 41 and 43, and the cylinder within the propeller shaft are filled with hydraulic fluid so that, when the handle 46 is forced to the right, hydraulic pressure built up in the cylinder 44 is transmitted to the propeller shaft cylinder to drive the piston 38 rightwardly, thereby shearing the pin 36 and forcing the sleeve 32 to the right and away from the internally threaded segments 30. Upon removal of the circumferential restraint afforded by the sleeve 32, said segments 30 are free to move radially away from the propeller shaft 20 leaving the propeller 25 with no means for holding it upon the shaft. Since in operation there will be substantial aerodynamic drag on the blades of the propellers 15 and 25, the force occasioned by this drag will slide the propellers rearwardly and off of their shafts 12 and 20, the propellers then dropping clear of the aircraft. It will be apparent that once the axial restraint of the nut 28 has been removed, the rear propeller 25 will first slide off of its shaft thereby leaving the forward propeller 15 free to move axially upon its shaft 12.

The specific details of propeller drive and propeller mounting form no specific part of the invention and it will be apparent to those skilled in the art that various modifications may be made to attain the essential objective of the invention, i. e., the selective release of one or more propellers during flight.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In aircraft provided with space for an occupant; an assembly including a propeller shaft and a propeller mounted thereon for rotation therewith during normal aircraft flight, said propeller being bodily sheddable in a flight emergency; means for locking said propeller to said shaft during normal aircraft flight; mechanical means operable during propeller rotation and while the aircraft is in flight to release said locking means, said propeller when so released being free to move along and off an end of said shaft; and a control means for said mechanical release means operable from within and by an occupant of said space.

2. In aircraft provided with space for an occupant; an assembly including a propeller shaft and a propeller mounted thereon for rotation therewith during normal aircraft flight, said propeller being bodily sheddable in a flight emergency; means for locking said propeller to said shaft during normal aircraft flight; mechanical means movable axially of said shaft during propeller rotation and while the aircraft is in flight to release said locking means, said propeller when so released being free to move along and off an end of said shaft; and a control means for said mechanical release means operable from within and by an occupant of said space.

3. In aircraft provided with space for an occupant; an assembly including a hollow propeller shaft and a propeller mounted thereon for rotation therewith during normal aircraft flight, said propeller being bodily sheddable in a flight emergency; means for locking said propeller to said shaft during normal aircraft flight; and mechanical means within the hollow of said shaft operable by an occupant of said space during propeller rotation and while the aircraft is in flight to release said locking means, said propeller when so released being free to move along and off of an end of said shaft.

4. In aircraft provided with space for an occupant; an assembly including a hollow propeller shaft and a propeller mounted thereon for rotation therewith during normal aircraft flight, said propeller being bodily sheddable in a flight emergency; means at the outer end of said shaft for locking said propeller to said shaft during normal aircraft flight; mechanical means within the hollow of said shaft operable during propeller rotation and while the aircraft is in flight to release said locking means, said propeller when so released being free to move along and off the outer end of said shaft; and a control means for said mechanical release means operable from within and by an occupant of said space.

5. In aircraft provided with space for an occupant; an assembly including a propeller shaft and a propeller mounted thereon for rotation therewith during normal aircraft flight, said propeller being bodily sheddable in a flight emergency; means for locking said propeller to said shaft during normal aircraft flight; and mechanical means operable by an occupant of said space during propeller rotation and while the aircraft is in flight to disrupt and render ineffectual said locking means, said propeller when so released being free to move along and off an end of said shaft.

6. In combination, a propeller drive shaft, a propeller hub detachably splined on said shaft, retaining means for holding said hub on said shaft, means for releasably locking said retaining means to said shaft, means coactable with said locking means adapted for releasing it from said retaining means to free said propeller from said shaft, and fluid pressure supply means including a manually operable control means for actuating said coactable means at will from a point remote therefrom.

7. In an aircraft, the combination of an engine including a propeller drive shaft, a propeller hub splined on said shaft, retaining means for holding said hub on said shaft, means for releasably locking said retaining means to said shaft, means coactable with said locking means adapted for releasing it from said retaining means to free said propeller for movement along and off the end of said shaft, and a fluid pressure supply line connected between said engine and said coactable means including a manually operable control means whereby pressure may be controlled at will to actuate said coactable means from a point remote therefrom.

8. In an aircraft propeller and shaft assembly for use in an aircraft having space for an occupant, said propeller being keyed to the shaft for rotation therewith but being slidable therealong, screw threads at an end of said shaft, a composite nut engaging said threads and securing the propeller against axial displacement, means remotely operable during propeller operation by said occupant to disassemble said composite nut from the shaft to allow of axial displacement of the propeller therealong, said composite nut comprising internally threaded segments engaging the shaft threads, and a sleeve embracing said segments.

9. In an aircraft propeller and shaft assembly for use in an aircraft having space for an occupant, said propeller being keyed to the shaft for rotation therewith but being slidable therealong, screw threads at an end of said shaft, a composite nut engaging said threads and securing the propeller against axial displacement, means remotely operable during propeller operation by said occupant to disassemble said composite nut from the shaft to allow of axial displacement of the propeller therealong, said composite nut comprising internally threaded segments engaging the shaft threads, a sleeve embracing said segments, and said remotely operable means comprising an axially movable plunger within the shaft engageable with said sleeve to move the latter axially, away from the segments.

10. In an aircraft propeller and shaft assembly for use in an aircraft having space for an occupant, said propeller being keyed to the shaft for rotation therewith but being slidable therealong, screw threads at an end of said shaft, a composite nut engaging said threads and securing the propeller against axial displacement, means remotely operable during propeller operation by said occupant to disassemble said composite nut from the shaft to allow of axial displacement of the propeller therealong, said composite nut comprising internally threaded segments engaging the shaft threads, a sleeve embracing said segments, and a key constraining the sleeve and segments against relative rotation.

11. In a propeller and shaft assembly, the propeller being keyed to the shaft for rotation therewith but being slidable therealong, screw threads at an end of said shaft, a composite nut engaging said threads and securing the propeller against axial displacement, means remotely operable during propeller operation to disassemble said composite nut from the shaft to allow of axial displacement of the propeller therealong, said composite nut comprising internally threaded segments engaging the shaft threads, a sleeve embracing said segments, and a shear pin crosswise of the shaft axis normally holding the sleeve and segments together.

CARL W. SCOTT.

REFERENCES CITED

The following references are of record in the file of this patent:

UNITED STATES PATENTS

| Number | Name | Date |
|---|---|---|
| 1,769,775 | Dicks | July 1, 1930 |
| 1,864,716 | Doremus | June 28, 1932 |
| 2,257,327 | Bradford | Sept. 30, 1941 |
| 1,288,136 | Neuteboom | Dec. 17, 1918 |
| 2,225,929 | Sarazin | Dec. 24, 1940 |
| 1,263,801 | Pugh | Apr. 23, 1918 |
| 1,467,537 | Dornier | Sept. 11, 1923 |
| 1,793,933 | Hoffman | Feb. 24, 1931 |
| 1,431,683 | Ramsay | Oct. 10, 1922 |
| 2,050,283 | Dixon | Aug. 11, 1936 |
| 1,921,893 | Steele | Aug. 8, 1933 |
| 1,800,094 | Muhlenbruck | Apr. 7, 1931 |
| 1,310,330 | Ferrier | July 15, 1919 |
| 1,672,163 | Krammer | June 5, 1928 |

FOREIGN PATENTS

| Number | Country | Date |
|---|---|---|
| 64,890 | Austria | Dec. 1, 1913 |